United States Patent
Girgensohn et al.

(10) Patent No.: US 6,807,361 B1
(45) Date of Patent: Oct. 19, 2004

(54) INTERACTIVE CUSTOM VIDEO CREATION SYSTEM

(75) Inventors: Andreas Girgensohn, Menlo Park, CA (US); John J. Doherty, San Francisco, CA (US); Lynn D. Wilcox, Palo Alto, CA (US); John S. Boreczky, San Leandro, CA (US); Patrick Chiu, Menlo Park, CA (US); Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 996 days.

(21) Appl. No.: 09/618,533

(22) Filed: Jul. 18, 2000

(51) Int. Cl.[7] .............................. H04N 5/93; H04N 5/76; G11B 27/00
(52) U.S. Cl. .............................. 386/52; 386/55; 386/117
(58) Field of Search .............................. 386/52, 55, 53, 386/46, 107, 117, 124, 1, 4, 6, 68, 69; 360/13; 358/909.1; 348/222.1; 345/723; H04N 5/93, 5/76; G11B 27/00

(56) References Cited

U.S. PATENT DOCUMENTS 6,072,542 A * 6/2000 Wilcox et al. .............. 348/722
6,748,158 B1 * 6/2004 Jasinschi et al. .............. 386/69

OTHER PUBLICATIONS

Boreczky, J. and Wilcox L. "A Hidden Markov Model Framework for Video Segmentation Using Audio and Image Features," in *Proc. ICASSP '98*, IEEE, May 1998, Seattle.

Boreczky, J. and Rowe, L. "Comparison of Video Shot Boundary Detection Techniques," Proc. SPIE Storage and Retrieval for Image and Video Databases IV, San Jose, CA, 1996.

Christal, M., Smith, M., Taylor, C and Winkler, D., "Evolving Video Skims into Useful Multimedia Abstractions," in Human Factors in Computing Systems, CHI 98 Conference Proceedings (Los Angeles, CA), New York: ACM, pp. 171–178, 1998.

Girgensohn, A. and Boreczky, J. "Time–Constrained Keyframe Selection Technique," in IEEE Multimedia Systems '99, IEEE Computer Society, vol. 1, pp. 756–761, 1999.

He, L., Sanocki, E., Gupta, A., Grudin, J. "Auto–Summarization of Audio–Video Presentations," ACM Multimedia, Nov., 1999.

Pfeiffer, S., Linehart, R., Fischer, S. and Effelsberg, W., "Abstracting Digital Movies Automatically," in Journal of Visual Communication and Image Representation, 7(4), pp. 345–353., Dec. 1996.

Russell, Daniel M, "A Design Pattern–based Video Summarization technique: Moving from Low–level Signals to High–level Structure," Jan. 2000.

Smith, M. and Kanade, T., "Video Skimming and Characterization through the Combination of Image and Language Understanding Techniques," in Proc. Computer Vision and Pattern Recognition, pp. 775–781, 1997.

Uchihashi, S. and Foote, J., "Summarizing Video Using a Shot Importance Measure and a Frame–Packing Algorithm," in Proc. ICASSP '99, vol. 6, pp. 3041–3044, 1999.

* cited by examiner

*Primary Examiner*—Robert Chevalier
(74) *Attorney, Agent, or Firm*—Fliesler Meyer LLP

(57) ABSTRACT

The present invention analyzes recorded video from a video camera to identify camera and object motion in the recorded video. Keyframes representative of clips of the recorded video are displayed on a user interface that allows a user to manipulate an order of the keyframes. Editing rules are then applied to the keyframes to intelligently splice together portions of the representative clips into a final output video.

35 Claims, 3 Drawing Sheets

INTERACTIVE CUSTOM VIDEO CREATION SYSTEM

BACKGROUND OF THE INVENTION

Video cameras are becoming increasing popular for both home and office use. Video is commonly used to document family events such as vacations, weddings, and graduations. In the office, video cameras are used to record presentations and user studies, and are often taken on business trips to record people, places, and meetings. Further, the use of Digital Video (DV), a digital camcorder format, is burgeoning due to the combination of high-quality digital video, inexpensive video capture cards and hard disk drives, and public interest in creating video content for the World Wide Web.

However, the problem is that it is difficult to make use of this video after it has been recorded. While people may view the video they recorded once or twice, it is typically left "in the bag," since interesting portions are often intermixed with longer, less interesting portions. The video is often of poor quality stemming from, for example, abrupt camera movements or video segments that are too long to hold the viewer's interest. Further, interesting portions may be difficult to find using only fast forward and rewind, particularly when the desired portion is short relative to the rest of the video or when different portions of the video are of interest to different people While video editing tools exist (e.g., Adobe Premier or In-Sync's Speed Razor) these tools are quite difficult for an amateur to use. Simpler video editing tools, such as Apple's iMovie, Ulead Systems' VideoStudio, or JavuNetwork, make it easy to select video takes and arrange them in a storyboard. However, none of these systems perform video analysis in order to provide intelligent editing assistance. In particular, most of these systems provide no assistance for selecting the in and out points necessary to trim the takes and, thus, a user must manually examine the video on a frame-by-frame basis and manually trim undesirable material from the takes. This task is difficult even with the simpler editing tools.

Accordingly, there is a need for an interactive video creation system for analyzing and composing video that does not require manual selection of the start and end points for each video clip. There is a need for an interactive video creation system that analyzes the video to identify suitable clips and applies a set of heuristic editing rules to automatically determine the start and end points for each clip.

SUMMARY OF THE INVENTION

The present invention, roughly described, provides an interactive video creation system for composing videos from recorded video of a video camera that automatically determines the start and end points for each video clip. The system analyzes the video to determine camera motion and speed. Segments of the video, or clips, that are suitable for inclusion in the final video are identified using a plurality of heuristic editing rules, and a keyframe for each suitable clip is displayed to the user in a storyboard interface. The keyframes can then be ordered in any desired sequence. The final output video is created by concatenating the selected clips.

These and other objects and advantages of the invention will appear more clearly from the following detailed description in which the preferred embodiment of the invention has been set forth in conjunction with the drawings.

DETAILED DESCRIPTION

Figure 1:
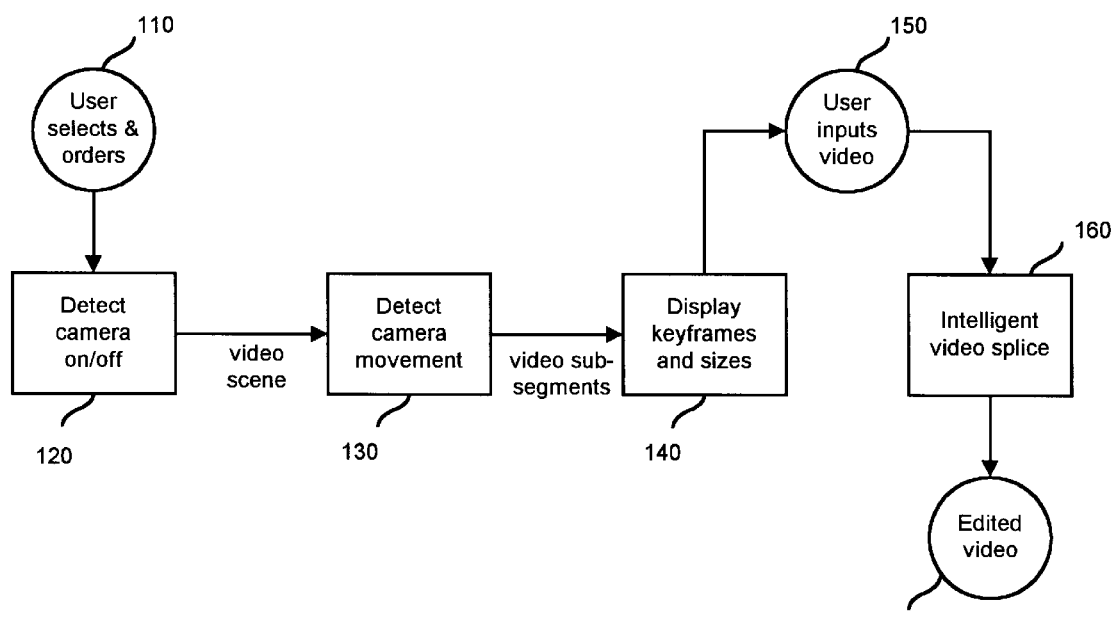
FIG. 1 illustrates a block diagram of the video creation system in accordance with the present invention.

FIG. 1 illustrates a block diagram of the interactive video creation system in accordance with the present invention. Recorded video from a video camera is inputted in block 110 and is subsequently digitized and segmented into takes in block 120 where a take is the video recorded between camera on and off transitions. The information regarding camera on and off transitions is typically provided by digital video cameras, in contrast with analog video cameras, and is preferred since it more closely approximate a user's intentions. For analog video cameras, the camera on and off transitions must typically be inferred from the recorded video by standard shot detection algorithms.

Each take is subsequently analyzed in block 130 and segmented into a plurality of segments according to camera movement detected in the respective takes by a motion detection algorithm discussed further below. The classes of video detectable by the motion detection algorithm are still, pan, tilt, zoom, and garbage. A still is broken into 2 sub-classes, one in which the camera is still but there is object motion, and the other where there is no object motion. A pan is any continuous horizontal camera movement. For classification, a pan is broken into 2 sub-classes, namely right pan and left pan. A tilt is any continuous vertical camera movement. Like the pan, the tilt is broken into two sub-classes, tilt up and tilt down. A zoom is a scale change in the camera image, and has 2 sub-classes: zoom in and zoom out. A zoom in results in a larger image and a zoom out results in a smaller image. For pans, tilts, and zooms, the camera movement is relatively slow. All fast or non-linear camera movement is placed in the garbage class. Knowledge of the type of camera (or object) motion is required in order to implement the editing rules and for keyframe selection. For example, video clips containing fast or erratic camera motion correspond to poor quality video and should be deleted. Slow camera motion in pans, tilts, and zooms must be identified, since multiple keyframes may be required to adequately display the content of the video.

Figure 2:
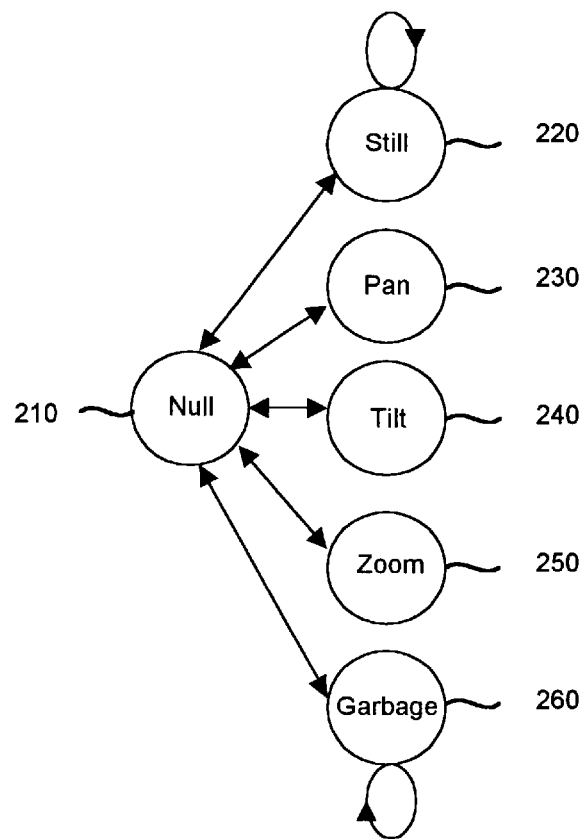
FIG. 2 and FIG. 2A illustrate a top level structure of a Hidden Markov Model used to segment the unedited video into regions corresponding to classes based on the type of camera motion.
Figure 2A:
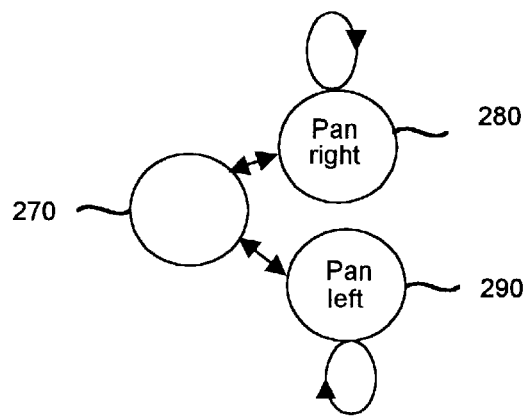

A Hidden Markov Model (HMM) is used to segment the video into regions corresponding to classes based on the type of camera motion. An ergodic HMM is used, since no assumptions can be made on how the recorded video was shot. FIG. 2 shows the top-level structure of the HMM. From an initial null state 210, a transition is made to a still class 220, a pan class 230, a tilt class 240, a zoom class 250, or a garbage class 260. The garbage class 260 is modeled by the single states shown. The self-transitions on these states model the duration of the class. All other states correspond to classes with sub-classes, modeled with sub-HMMs. An example for the pan sub-HMM is also illustrated in FIG. 2A. In FIG. 2A, a transition is made to one of the sub-class states, a pan right class 280 and a pan left class from an initial null state 270, with the self transitions in these states modeling duration.

The feature vectors for the HMM are motion vectors computed over sub-blocks of the image. These can either be motion vectors from a Moving Picture Experts Group (MPEG) encoding or another motion capture technique. The feature probability distributions for the HMM are full-covariance Gaussians. The full covariance is needed to model the correlation between motion vectors, a critical component of motion classification. The parameters are learned from training video labeled according to class. The Gaussian probabilities are initialized with the means and covariance matrices of training data in the class. These parameters as well as the transition probabilities are then re-estimated using a Baum Welch algorithm during the training procedure.

Once the HMM is trained, each take in the video is segmented into classes using the HMM. A standard Viterbi algorithm is used to determine the most likely sequence of states and hence the most likely class for the video at each time. These classes then define the clips of the video where a clip is an unbroken set of contiguous frames (a frame being a single, still image taken from the recorded video). Other feature sets may also be used as feature vectors for the HMM. For example, two features can be computed from the motion vectors of nine sub-blocks of each image (i.e., one being the sum of the magnitudes of all nine motion vectors and the other being the magnitude of the sum of the motion vectors). While this methodology produces reasonable performance in finding pans, tilts, and zooms, it degrades in the presence of object motion.

Keyframes are then selected in block 140 from the clips based on the type of camera movement detected. A keyframe is a still frame that is well suited to represent a particular video clip selected for the final output video where each clip is represented by one or more frames. Either single or multiple keyframes are selected from clips previously classified as either still, pan, tilt, or zoom. For still regions with a static image, a single keyframe is selected. In this case, a keyframe near the end of a shot is selected based on an editing rule specifying that typical shots are most interesting towards the end.

For pans, tilts, or zooms, and for stills with object motion, multiple keyframes are selected so that the user can better control the content of the shot. Multiple keyframes are selected by using hierarchical agglomerative clustering to segment the region into homogenous regions, and then choosing a keyframe from each region. The clustering is initialized with each frame in the clip being its own cluster. A distance between adjacent frames is computed based on a histogram difference. The closest two adjacent frames are merged iteratively, until the merge distance exceeds a threshold. If any of the resulting clusters are shorter then a preset minimum length, the agglomerative clustering is continued for that cluster. The minimum length is determined from an editing rule specifying that video clips should not be too short. A minimum length for a video clip is typically 3 seconds and clustering is typically not performed on clips shorter than the minimum length. A keyframe is then selected for each of the resulting clusters, again near the end of the clip.

Figure 3:
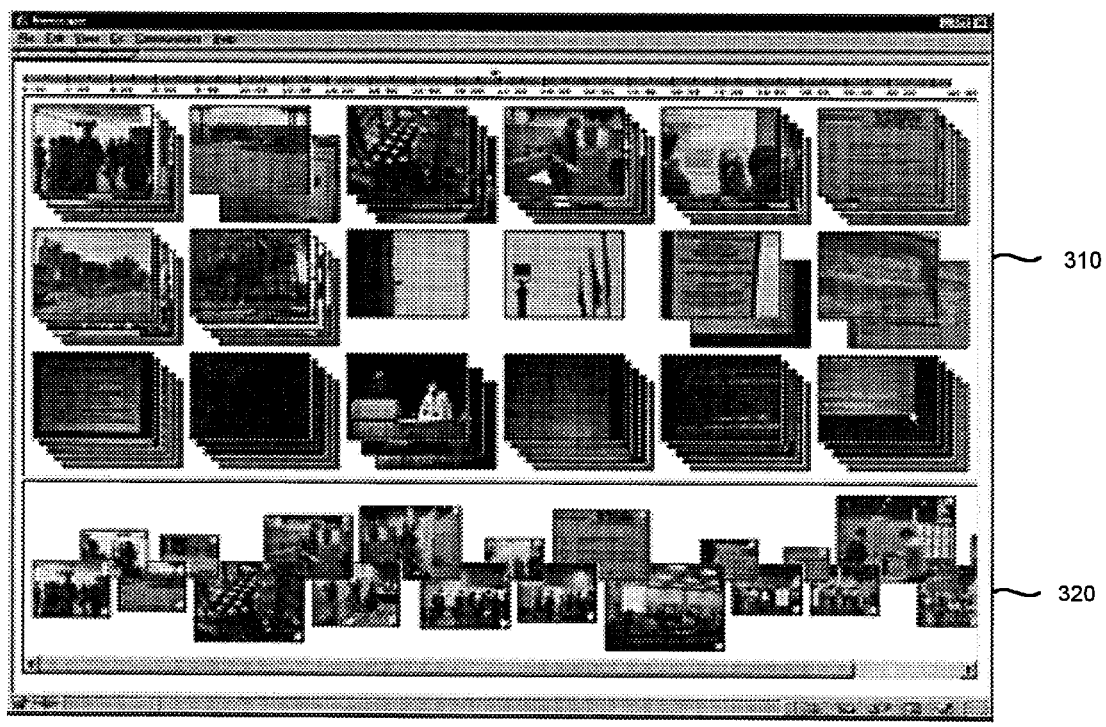
FIG. 3 illustrates an exemplar user interface comprising first and second user interface displays.

Once selected, the keyframes are displayed in a keyframe or user interface as illustrated in FIG. 3. Keyframes from clips of the video are shown in the time order in which they occurred. In one embodiment of the present invention, the size of the keyframe is proportional to the duration of the clip it represents. Keyframes are displayed for clips classified as still, pan, tilt and zoom. For still clips, a single keyframe image is displayed while for pans, tilts, and zooms the number of images depends on the number of clusters detected. Keyframes are, by default, not shown for garbage clips as it is assumed that this video is undesirable. Nevertheless, a special setting in the keyframe interface is provided for users who wish to view keyframes for garbage clips. In step 150, the user is allowed to select the parts of the recorded video to be included in the final output video from the user interface and to also specify the order of the material.

The exemplar user interface 300 of FIG. 3 comprises first and second interface displays. First interface display 310 displays keyframes representative of respective video clips in the time order in which they occurred and allows users to select clips from the recorded video by selecting the corresponding keyframe. All selected clips in first interface display 310 are clustered by the similarity of their color histograms and similar clips can be arranged in a plurality of piles. The piles are shown row-by-row in the time order of the first clip in each pile. Each pile is also in chronological order. The available window area determines the number of piles that can be displayed.

A hierarchical clustering method is used to create a binary cluster tree, which allows a user to select exactly as many clusters as there are piles by cutting through the cluster tree at the corresponding level. The use of a larger window allows for more piles to be displayed and this leads to more intuitive results where truly similar images are grouped together. To see additional images in a pile, the user can expand the pile by clicking on it. The current display is faded out and the images comprising the pile are shown in an area in the middle of the faded out display. By still showing the main display as a faded out background, the user is provided with a context for the drill-down browsing. The display of the expanded pile may also contain piles. In this way, expanded displays can be collapsed one or more levels by clicking on the corresponding faded out area.

Second interface display 320 is a storyboard interface or a timeline interface for composing the output video. Second interface display 320 allows the user to drag desired keyframes from first interface display 310 and place them in any order along the timeline of second interface display 320. The keyframes can be reordered by dragging them to different points in the timeline. In one embodiment, the keyframes in second interface display 320 are staggered to save horizontal space. Less scrolling would thus be required to view the entire timeline. In another embodiment, the keyframes in the second interface display are displayed in a single row.

Finally, in block 160, an intelligent video splicer applies a plurality of editing rules to choose appropriate sections of video around the selected keyframes and merges them in block to create the final output video in step 170. That is, once the representative keyframes have been selected and placed in a given order in the storyboard interface, the present invention automatically determines the appropriate clips of video to include in the final output video. The task of determining the amount of video to include around each of the selected keyframes depends on the quality of the video and whether or not adjacent keyframes have been selected. This, in turn, depends on the editing rules employed.

Generally, people who are experienced with editing video employ an implicit set of editing rules to help make editing decisions. The following general editing rules not only aid in the selection of video in and out points, but also embody contextual information: (1) a shot should neither be too long nor too short; (2) avoid cutting between two shots in the same take—merge shots unless time constraints are violated; (3) do not include shots with overly fast camera movement—they are difficult to watch and non-informative;

(4) if the shot is too long, select a sub-clip near the end of the shot, since interesting material is most often near the end of a shot; (5) a short zoom, pan, or tilt should begin and end with a still—longer clips can stand on their own; and (6) a shot should have a minimum degree of brightness.

In accordance with the present invention, the following, more specific, editing rules are employed: (1) the minimum shot length is three seconds, the maximum shot length is ten seconds, and the standard shot length is five seconds; (2) if two shots are selected from the same take and if the clip between them is less than three seconds, merge the shots—trim the outer ends if necessary to keep the entire shot less than ten seconds; (3) never include clips classified as garbage; (4) when trimming an overly long clip, select a sub-clip toward the end of the take; (5) a zoom, pan, or tilt less than five seconds should not be included unless there is a still clip on either end to include—extend the clip to include stills on either side while keeping the total length less than ten seconds; and (6) the average brightness of a shot should exceed a preset threshold.

A constraint satisfaction system is used to apply these editing rules. This approach is advantageous in that the editing rules can be changed quickly and new rules added. Further, editing rules can be prioritized to deal with over-constrained situations. Such a constraint-based approach can also incorporate both local and global constraints. For example, the length of individual shots could be adjusted if a final output video having a certain length is desired. After viewing the final output video, the user may wish to make changes in the edited video. This can be done at one level by deleting keyframes from the storyboard interface and inserting new ones. For finer edits, such as changing the duration of specific clips, a standard video editing interface with which the user can specify in and out points must be provided.

Several variations on the above algorithms for creating output videos are possible. For example, in one embodiment, an output video can be automatically generated by simply selecting the middle sections from each take. In one embodiment, a three second section could be selected. In another embodiment, a five second section could be selected. If user intervention is allowed, the user could select which takes to include by viewing a single keyframe from each take. In another embodiment, an output video can be generated automatically by selecting a section from each take based on video quality of that section. For example, clips having the highest video quality from each take could be chosen. The editing rules applicable to this second approach based on highest quality video clips are similar to the editing rules above (e.g., standard, minimum, and maximum clip lengths are specified, and garbage sections are discarded), with an additional rule that still camera clips are preferred over clips having camera motion. As above, a user could select which takes are to be included in the final output video.

In another variation to the present invention, instead of the keyframe display in the user interface for selecting shots for the final output video being static, a dynamic user interface could be provided. A user using the dynamic user interface could, for example, press a sequence of buttons while the video corresponding to the keyframes is playing to indicate that the current clip should be omitted from or included in the final output video. This dynamic interface could be also be combined with and used in conjunction with the static user interface.

The foregoing description of preferred embodiments of the present invention has been provided for the purposes of illustration and description. It is not intended to be exhaustive or to limit the invention to the precise forms disclosed. Obviously, many modifications and variations, an example being the dynamic user interface described above, will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A video creation system for analyzing recorded video from a video camera to produce a final output video, the system comprising:
    a camera motion detector, the camera motion detector segmenting respective takes of the recorded video into clips, the clips being classified according to camera motion detected in respective takes; and
    a video splicer, the video splicer applying a plurality of editing rules to determine whether video frames adjacent to keyframes representative of respective clips are spliced together to create the final output video.

2. The system of claim 1 further comprising a digitizer, the digitizer digitizing the recorded video and segmenting the recorded video into takes corresponding to camera on and camera off transitions.

3. The system of claim 1 further comprising a user interface, the user interface displaying respective selected keyframes and permitting a user to change a sequence of the keyframes to any desired order.

4. The system of claim 3, wherein the user interface comprises a keyframe interface and a storyboard interface.

5. The system of claim 4, wherein a size of respective keyframes displayed in the keyframe interface is proportional to a duration of respective clips represented by the corresponding keyframe.

6. The system of claim 4, wherein a user can arrange respective keyframes displayed in the keyframe interface onto the storyboard interface in any desired time sequence.

7. The system of claim 3, wherein the user interface is a dynamic user interface, the dynamic user interface enabling a user to omit the clip being viewed from the final output video while the recorded video is playing.

8. The system of claim 7, wherein the dynamic user interface is used in conjunction with a static user interface.

9. The system of claim 3, wherein the user interface enables a user to include the clip being viewed in the final output video.

10. The system of claim 1 further comprising a keyframe selector, the keyframe selector enabling a user to select at least one keyframe representative of respective clips.

11. The system of claim 10, wherein a single keyframe is selected and displayed for clips classified as a still class having a static scene.

12. The system of claim 10, wherein multiple keyframes are selected and displayed for clips having object motion therein.

13. The system of claim 12, wherein multiple keyframes are selected using hierarchical agglomerative clustering to segment respective clips into homogeneous regions and choosing keyframes from respective regions.

14. The system of claim 1, wherein the video splicer employs a constraint satisfaction system for applying the plurality of editing rules.

15. The system of claim 1, wherein an ergodic Hidden Markov Model is used to segment respective takes into clips based on camera motion classes detected in the take by the camera motion detector.

16. The system of claim 1, wherein respective clips are classified according to camera motion comprising a still class, a pan class, a tilt class, a zoom class, and a garbage class.

17. The system of claim 1, wherein the editing rules comprise:
- discarding respective clips having a length less than a minimum length, the minimum length being substantially equal to three seconds;
- trimming respective clips having a length that exceeds a maximum length, the maximum length being substantially equal to ten seconds;
- merging two clips, to be included in the final output video, selected from the same take if the two clips are separated by less than three seconds to avoid cutting between the two clips;
- discarding clips having fast and non-linear camera motion and clips classified as a garbage class;
- selecting a sub-clip near an end of a shot if the shot exceeds the maximum length;
- discarding clips comprising a zoom, a pan, and a tilt having durations less than five seconds unless a still clip exists on either end of the zoom, the pan, and the tilt; and
- selecting the shot if the shot has a minimum brightness above a predetermined brightness threshold.

18. The system of claim 17, wherein the predetermined brightness threshold is substantially equal to 30% brightness.

19. The system of claim 1, wherein the video splicer applies the editing rules to automatically determine a video in point and a video out point for respective clips.

20. A method for creating custom videos from recorded video of a video camera, the method comprising the steps of:
- detecting camera movement in respective takes of the recorded video;
- segmenting respective takes into clips based on classes of camera movement detected;
- displaying selected keyframes representative of respective clips on a user interface, the selection of respective keyframes based on the classes of camera movement detected; and
- applying editing rules to the keyframes displayed in the user interface to choose sections of video around respective keyframes to splice together to create the final output video.

21. The method of claim 20 further comprising the step of digitizing the recorded video and segmenting the digitized recorded video into takes.

22. The method of claim 21, wherein respective takes are defined by digitized recorded video between a camera on transition and a camera off transition.

23. The method of claim 20, wherein an ergodic Hidden Markov Model segments respective takes into clips based on camera motion classes detected in the take by the camera motion detector.

24. The method of claim 23, wherein the camera motion classes comprise a still class, a pan class, a tilt class, a zoom class, and a garbage class.

25. The method of claim 20, wherein a single keyframe is selected for clips comprising camera motion classified as a still class having a static scene.

26. The method of claim 20, wherein multiple keyframes are selected for clips comprising camera motion respectively classified as a pan class, a tilt class, a zoom class, and a still class having object motion.

27. The method of claim 26, wherein multiple keyframes are selected using hierarchical agglomerative clustering to divide respective clips into homogeneous regions and choosing keyframes from respective regions.

28. The method of claim 20, wherein a size of respective selected keyframes displayed on the user interface is proportional to a duration of clips represented by respective selected keyframes.

29. The method of claim 28, wherein the user interface comprises a keyframe interface and a storyboard interface where a user can place respective selected keyframes displayed in the keyframe interface onto the storyboard interface in any desired sequence.

30. The method of claim 20, wherein the user interface comprises a first display interface and a second display interface.

31. The method of claim 30, wherein the static user interface displays selected keyframes and the dynamic user interface enables a user to dynamically select clips to be omitted from the final output video while the recorded video is playing.

32. The method of claim 20, wherein the step of applying editing rules further comprises the steps of:
- discarding respective clips having a length less than a minimum length, the minimum length being substantially equal to three seconds;
- trimming respective clips having a length that exceeds a maximum length, the maximum length being substantially equal to ten seconds;
- merging two clips, to be included in the final output video, selected from the same take if the two clips are separated by less than three seconds to avoid cutting between the two clips;
- discarding clips having fast and non-linear camera motion and clips classified as a garbage class;
- selecting a sub-clip near an end of a shot if the shot exceeds the maximum length;
- discarding clips comprising a zoom, a pan, and a tilt having durations less than five seconds unless a still clip exists on either end of the zoom, the pan, and the tilt; and
- selecting the shot if the shot has a minimum brightness above a predetermined brightness threshold.

33. The method of claim 20, wherein the step of applying editing rules further comprises the step of automatically determining a video in point and a video out point for respective clips.

34. The method of claim 20, wherein the segmenting step segments respective takes into clips based, alternatively, on video quality rules.

35. The method of claim 34, wherein keyframes representative of clips having a highest video quality from respective takes are selected.

* * * * *